(12) United States Patent
Giraud et al.

(10) Patent No.: US 11,189,166 B2
(45) Date of Patent: Nov. 30, 2021

(54) ANTICIPATORY MOTORCYCLE SAFETY SYSTEM

(71) Applicant: Damon Motors Inc., Vancouver (CA)

(72) Inventors: Damon Jay Giraud, North Vancouver (CA); Dominique Kwong, Coquitlam (CA)

(73) Assignee: Damon Motors Inc., Vancouver (CA)

( * ) Notice: Subject to any disclaimer, the term of this patent is extended or adjusted under 35 U.S.C. 154(b) by 81 days.

(21) Appl. No.: 16/761,176

(22) PCT Filed: Nov. 2, 2018

(86) PCT No.: PCT/CA2018/000208
§ 371 (c)(1),
(2) Date: May 1, 2020

(87) PCT Pub. No.: WO2019/084663
PCT Pub. Date: May 9, 2019

(65) Prior Publication Data
US 2021/0166558 A1    Jun. 3, 2021

Related U.S. Application Data

(60) Provisional application No. 62/580,629, filed on Nov. 2, 2017, provisional application No. 62/580,758, filed on Nov. 2, 2017, provisional application No. 62/580,610, filed on Nov. 2, 2017, provisional application No. 62/580,647, filed on Nov. 2, 2017.

(51) Int. Cl.
*G08G 1/0962* (2006.01)
*G08G 1/01* (2006.01)
*G08G 1/16* (2006.01)

(52) U.S. Cl.
CPC ......... *G08G 1/0962* (2013.01); *G08G 1/0133* (2013.01); *G08G 1/166* (2013.01)

(58) Field of Classification Search
CPC .... G08G 1/0962; G08G 1/0133; G08G 1/166; G08G 1/205; G01S 17/86; G01S 17/931; G01S 17/93; G01S 13/931
See application file for complete search history.

(56) References Cited

U.S. PATENT DOCUMENTS

| | | |
|---|---|---|
| 6,396,417 B2 | 5/2002 | Lee |
| 8,248,270 B2 | 8/2012 | Nieves |
| 9,227,682 B2 | 1/2016 | Oettgen |
| 9,701,307 B1 | 7/2017 | Newman |

(Continued)

FOREIGN PATENT DOCUMENTS

| | | |
|---|---|---|
| CA | 2986360 | 11/2016 |
| CN | 2607318 | 3/2004 |

(Continued)

*Primary Examiner* — Ryan W Sherwin
(74) *Attorney, Agent, or Firm* — Damien G. Loveland

(57) ABSTRACT

Multiple sensors detect the environment of a motorcycle, including an intersection and a vehicle at the intersection. The direction and speed of both the motorcycle and vehicle are determined and, using these, times are calculated for the motorcycle and vehicle to reach a given point in the intersection. Depending on the times to arrive at the point, a probability of a collision is estimated. The rider of the motorcycle is alerted if there is a considerable probability of a collision, via haptic alert devices.

20 Claims, 9 Drawing Sheets

(56) References Cited

U.S. PATENT DOCUMENTS

| | | |
|---|---|---|
| 9,802,537 B2 | 10/2017 | Tetsuka |
| 10,176,524 B1* | 1/2019 | Brandmaier ............ G06Q 40/08 |
| 10,553,115 B1* | 2/2020 | Ismaili .............. G08G 1/096716 |
| 2010/0253542 A1* | 10/2010 | Seder .................... G01S 13/931 340/932.2 |
| 2011/0316719 A1* | 12/2011 | Obuchi ............ G08G 1/096783 340/917 |
| 2012/0083960 A1* | 4/2012 | Zhu ......................... B60T 17/18 701/23 |
| 2016/0144915 A1 | 5/2016 | Bejestan |
| 2016/0210836 A1 | 7/2016 | Allen |
| 2016/0368492 A1* | 12/2016 | Al-Stouhi .............. G08G 1/162 |
| 2017/0146358 A1 | 5/2017 | Ward |
| 2017/0168630 A1 | 6/2017 | Khoshkava et al. |
| 2017/0206789 A1* | 7/2017 | Shimizu ................ G05D 1/0257 |
| 2017/0213462 A1* | 7/2017 | Prokhorov ............ G08G 1/0965 |
| 2019/0176919 A1* | 6/2019 | Santucci .................... B62J 6/01 |
| 2021/0163013 A1* | 6/2021 | Ueno .................... B60W 40/04 |

FOREIGN PATENT DOCUMENTS

| | | |
|---|---|---|
| DE | 10242447 | 3/2004 |
| JP | 201668769 | 5/2016 |
| WO | 2011035350 | 3/2011 |
| WO | 2012076635 | 6/2012 |
| WO | 2017028997 | 2/2017 |

* cited by examiner

ANTICIPATORY MOTORCYCLE SAFETY SYSTEM

TECHNICAL FIELD

This application relates to personal safety in personal mobility vehicles. In particular, it relates to determining the probability of an accident of a motorcycle, by using several detection means in real time and analyzing their outputs.

BACKGROUND

Motorcycles are fundamentally unsafe, with riders being many times more likely to die in an accident than car drivers. Every year, 160 million motorcycles are sold, which is double the number of cars. South East Asia accounts for 86% of the motorcycles that are sold, where they outnumber cars by a factor of ten.

In South East Asia, motorcycle ridesharing is fast becoming the primary mode of travel. Rideshare operators are projected to surpass 1 million rides per day. It is especially important for these companies to use the safest possible motorcycles.

Proactive safety eco-systems do not exist in the motorcycle or personal mobility industry today. Traction control, anti-lock, braking, lane keep assist, and others are examples of reactive safety systems whereby a loss of control and/or stability has occurred with the vehicle and now the system acts to regain control and/or stability. Further, safety systems are isolated to protecting a lone vehicle and the status of the vehicle is kept local without any ability to communicate this information to other vehicles and/or systems. Threat detection severity, directionality, and priority are not all taken into consideration in the algorithms used in modern, advanced driver assistance systems. Furthermore, there are no systems, devices or algorithms that can predict the likelihood of an accident for a given traffic environment, weather conditions, and rider behaviour.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention is directed to a method and system which incorporates detection components, algorithms and output devices for warning riders of motorcycles of potential hazards, or informing them of lack of a serious hazard. The detection components include sensors for detecting traffic light status, intersection type (via geo-location), objects (vehicles, pedestrians, animals, etc.), vehicle signal lights, vehicle wheel direction, intersection location, environmental conditions, road surface conditions, motorcycle conditions, motorcycle state, and rider behaviour. The algorithms allow for the prediction of potential traffic threats from the detection of vehicles, objects, pedestrians, traffic light status, intersection type, rider motorcycle velocity and direction of travel. Output devices are included to alert the rider of potential and/or impending threats.

Threat severity, directionality, and priority are taken into consideration by the algorithms used in the invention, as well as rider behaviour, environmental conditions, and vehicle dynamics, in order to predict the probability of an accident if the motorcycle were to continue on its current trajectory and path without any change to speed and direction.

A method for threat prediction for the anticipatory safety system described herein involves deconstructing accidents for scenario modelling and threat detection before an accident threat occurs. It takes into account behavioural cues in a sideswipe scenario, a rear-end scenario and a t-bone scenario. Information that is taken into account includes whether the road surface is wet or dry, as detected by forward looking cameras: whether the car behind the motorcycle rider is too close to a initiate sudden brake to avoid a threat ahead; whether an opposing car waiting to turn across the rider's path has started moving from a standstill position; and whether the car ahead of the rider has just turned from the straight-on direction and is blocking the line of sight of an opposing car intending to turn across the path of the rider.

The embodiments of the present invention each provide one or more of the following advantages: predicting the probability of an accident if a motorcycle were to continue on its current trajectory without any change of speed or direction; reduction in the likelihood of a collision with an opposing vehicle turning across the path of the motorcycle; reduction of the probability of collision with cross-traffic in an intersection; and reduction of the probability of collision from behind while approaching an intersection.

The invention may be used in intersections with traffic lights, intersections in residential neighbourhoods without traffic lights, at roundabouts, at on- and off-ramps to highways, and so on.

As disclosed, an aspect of the present invention is a method for informing a motorcycle rider about a traffic scenario comprising the steps of: detecting an environment of the motorcycle; analyzing the environment to determine the traffic scenario; determining, using the determined traffic scenario and a detected behaviour of the motorcycle, a probability of an accident involving the motorcycle in the traffic scenario; and outputting an alert on the motorcycle that is indicative of the probability. In some embodiments, detecting the behaviour of the motorcycle occurs by determining a speed of the motorcycle and determining a direction of travel of the motorcycle; wherein detecting the environment comprises: detecting an intersection; detecting a traffic light status at the intersection; detecting a vehicle at the intersection, the vehicle forming at least a part of the traffic scenario; detecting a direction of the vehicle; and detecting a speed of the vehicle; wherein the analyzing step uses data regarding the intersection, traffic light status, vehicle direction and vehicle speed. Some embodiments involve calculating, using the speed and direction of the motorcycle, a time that the motorcycle is expected to take to reach a point in the intersection; calculating, using the speed and direction of the vehicle, a time that the vehicle is expected to reach the point; and calculating a difference between said times; wherein the step of determining the probability uses said difference.

As further disclosed, another aspect of the present invention is a system for informing a motorcycle rider about a traffic scenario comprising: a processor; multiple sensors mounted on the motorcycle and connected to the processor; multiple haptic alert devices mounted on the motorcycle and connected to the processor; and computer readable memory storing computer readable instructions. The instructions, when executed by the processor cause the processor to: detect an environment of the motorcycle by reading data from said sensors; analyze the environment to determine the traffic scenario; determine, using the determined traffic scenario and a detected behaviour of the motorcycle, a probability of an accident involving the motorcycle in the traffic scenario; and output an alert via at least one of the haptic alert devices, the alert being indicative of the probability.

BRIEF DESCRIPTION OF DRAWINGS

The following drawings illustrate embodiments of the invention and should not be construed as restricting the scope of the invention in any way.

DESCRIPTION

A. Glossary

The term "traffic lights" refers to the traffic directing lights at an intersection or junction, and they are sometimes referred to as "traffic signals".

The term "engine control unit (ECU)" refers to the computer that controls and monitors various components and states of an engine.

The term "haptic" refers to both the sense of touch (tactile feedback) and the ability to detect shape and forces (kinesthetic feedback). Tactile feedback is used to detect surface texture, temperature and vibrations, for example. Kinesthetic feedback is used to detect changes in shape, motion, forces and weights.

The term "at the intersection" includes on the intersection, partially on the intersection, approaching the intersection and waiting to come onto the intersection, while being detectable by or visible from the motorcycle.

The term "lidar" (Light Detection and Ranging) is a sensing method that uses pulsed laser light to measure distances.

The term "module" can refer to any component in this invention and to any or all of the features of the invention without limitation. A module may be a software, firmware or hardware module.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by code or a module. The processor, if comprised of multiple processors, may be located together or separate from each other.

The term "rider" refers to the primary operator, i.e. the person who drives or controls a motorcycle, and is to be distinguished from a person who rides pillion on the motorcycle or otherwise as a passenger.

The term "system" used herein relates to the safety system of the present invention, unless otherwise qualified.

The term "threat area" refers to a measurable distance between the rider and the vehicle that the rider needs to be notified about. This measurable distance can apply to vehicles ahead, to the side or behind and can include vehicles in other vehicle lanes besides that of the rider.

B. Overview

Figure 1:
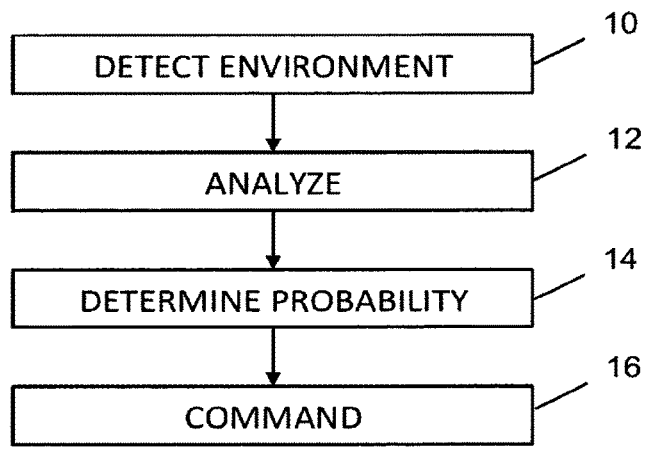
FIG. 1 is a flowchart showing a general method of the invention.

Referring to FIG. 1, an overview of the safety method. In step 10, the method detects an environment of a motorcycle such as an intersection, a traffic light status and vehicles that surround the motorcycle. In step 12, the data provided by the detection step 10 is analyzed and then a probability of collision between the motorcycle and an object, such as a vehicle, is determined in step 14. After that, related to the probability determination, a decision is taken and a command or order is transferred to various devices intended to alert the motorcycle driver in step 16.

C. Exemplary Embodiment

Figure 2:
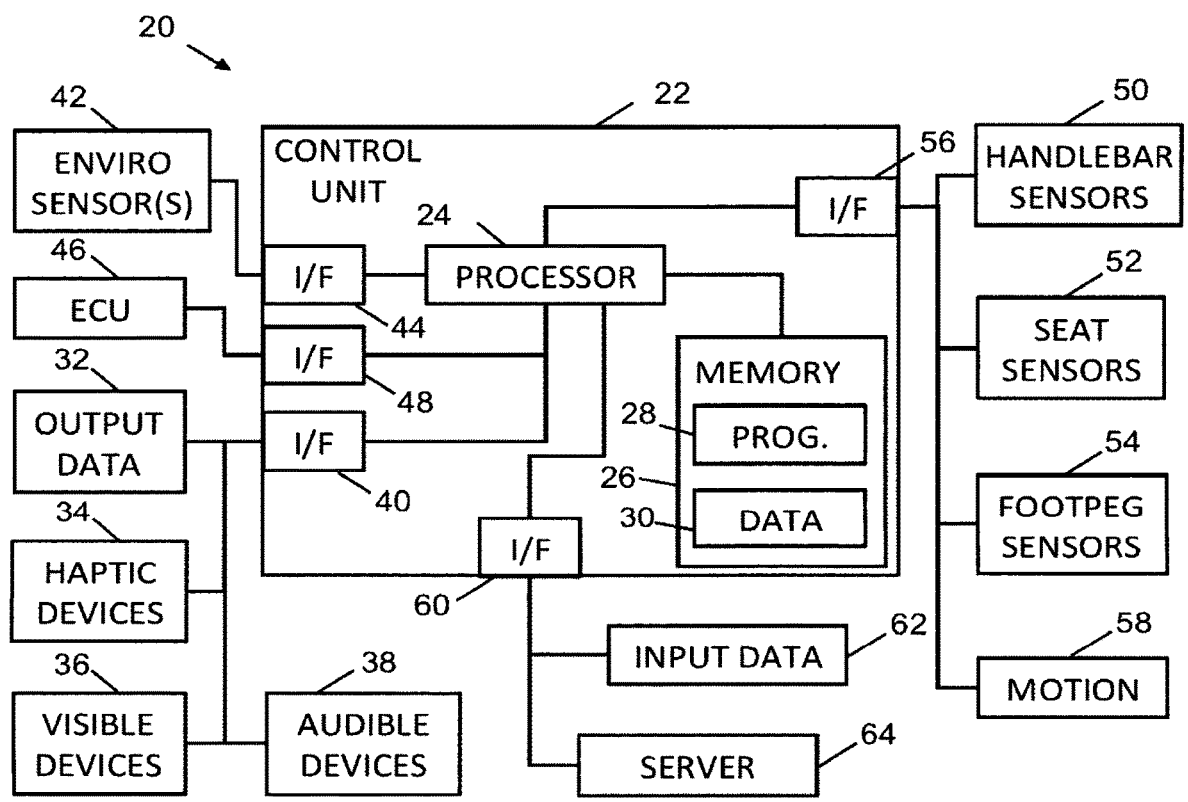
FIG. 2 is block diagram representing an embodiment of the safety system of the present invention.

Referring to FIG. 2, there is shown an exemplary embodiment of the structure of the safety system 20 in accordance with the processor-implemented invention described herein. The system 20 includes a control unit 22 with one or more processors 24 which are operably connected to a computer readable memory 26. The computer readable program 28 is stored in the memory 26 and computer readable data 30 is also stored in the memory.

Environmental sensors 42 are connected to the processor 24 via an interface 44. Sensors include sensors for detecting the environment of the rider, and include one or more of a forward looking camera, a rearward looking camera, a sideways looking camera, a stereo vision camera, radar, lidar, a microphone and an infrared detector. Infrared detectors can detect heat signatures (e.g. shapes, intensities) of people, animals and other vehicles. Microphones can detect audible muffler signatures and rolling resistance signatures that help with the detection of vehicle weight, size, direction and speed. Microphones may be directional microphones. Sensors mounted under the motorcycle can look under other vehicles or they may be mounted higher on the motorcycle, or both. In some embodiments, the sensors adjust their field of view and depth of coverage area based on speed, rider ability level, traffic density, amount of ambient light, geographical riding area (country road vs. city streets), etc. An environmental sensor such as a camera may in some embodiments be mounted on the helmet of the rider, and be connected via a Bluetooth™ protocol to the control unit 22. Helmet mounted cameras may point forwards, sideways and backwards.

The signals from the sensors 42 are analyzed to detect stationary and moving objects, and the speed, direction and behaviour of the moving objects. For example, the degree to which the front wheels of a car are angled, and the distance between the motorcycle and other vehicles are detected. Sensors 42 also detect elevation, outside temperature, humidity, road temperature and atmospheric pressure.

In the same manner the ECU 46 (Engine Control Unit) is connected to a processor 24 by means of an interface 48. Information the processor 24 obtains from the ECU 46 include speed, RPM (revs per minute), gear position, throttle setting, GPS (Global Positioning System) coordinates, tire pressure, engine faults, warnings, air to fuel ratio, etc.

Output devices including data output 32, haptic devices 34, visible devices 36 and audible devices 38 are connected to the processor 24 via an interface 40. Haptic devices include, for example, haptic vibration motors located in the handlebar, footpegs, and seat, on both left and right sides of the motorcycle. The vibration location(s) 'point' to location of the threat, depending on whether the left or right side haptic devices are activated. For example, a right, rear threat will cause the right handlebar and footpeg to vibrate, and a forward right threat will cause the front right handlebar to vibrate. The vibration cadence (pulse rate) communicates severity or urgency of a traffic scenario. Other haptic threat mechanisms that can be used in the devices include piezo actuators that may be linear or non-linear, electro-active polymers, and electro-magnifying resonance boosters in the rider's gloves and/or in the handlebar grip.

A variety of rider sensors are also connected to the control unit. Handlebars sensors 50, seat sensors 52 and foot peg sensors 54 mounted on the motorcycle are connected to the processor 24 through an interface 56. Sensors 50, 52, 54 detect the state of the rider, such as pressure distributed on the seat, pressure or force on the handlebars, and force on the footpegs. The sensors for detecting the state of the rider detect the rider's position on the seat, e.g. whether neutral, forward, rearward, left or right. They can also detect the rider's ability level, comfort level, and intentions, such as the intention to turn before the handlebars are actually moved. For example, the rider may have a death grip on the handlebars indicating extreme nervousness or aggression, or one hand is not on a grip indicating less than optimum ability to control the motorcycle.

A rider behaviour model is included in the program 28, and the model, e.g. an artificial intelligence (AI) model, is trained to understand rider state and intent moments before a predictable accident.

Motion sensors 58, e.g. accelerometers, detect the sideways lean of the motorcycle, the rate of change of lean, the fore and aft pitch of the motorcycle and the rate of change of the pitch.

For example, the system 20 collects body weight data at six points of contact via force sensors, with the hands, feet and ischial tuberosity, and from this can calculate the rider's centre of mass. A change in body weight distribution is correlated with a rider intent, in relation to geolocation, speed and other data points. Rider intent can be calculated for the following second or fraction of a second, based on change of the rider's centre of mass or the change in rider weight distribution to predict the probability of rider error and/or an external collision threat. For example, the system may detect increased pressure to left handlebar just before a left counter steer turn at 50 mph. Haptic notifications automatically adjust relative to the rider behaviour, rider size, and ability.

Further interfaces are included in other embodiments, such as an interface 60 to the internet or a cellular data service 62. This is for receiving information on hazards that are stored remotely, for receiving updates to the program of the control unit, or for receiving other data. Information or data 62 that may be received by the safety system 20 includes data about fixed objects, such as traffic lights, traffic light status (e.g. colour or whether damaged, or non-operational), streetlights, streetlight state, potholes, manholes, road curvature, etc. Transmission of such data to the safety system 20 occurs via wifi when the motorcycle is at the rider's home, via the rider's smartphone when riding, depending on availability of a data connection or on the importance or urgency of the data, or via a direct data connection to the safety system using an LTE (Long-Term Evolution) protocol. The transmission of the data is prioritized according to importance, urgency and use-case, taking into account the cost of transmission of the data payload and the performance of the particular transmission protocol used. Data may be crowd-sourced, for example, by other riders that are using the safety system 20. Crowd-sourced data may be pre-processed by a low-latency learning algorithm before being transmitted to the safety system, and may be pre-processed using edge computing, for example. Deeper learning algorithms may be employed at a server 64 to generate more reliable data, and the ability to detect new threats, for transmission to the safety system.

The program 28, when executed by the processor 24, monitors signals from the various inputs to the control unit 22, i.e. it monitors signals from the sensors 42, 50, 52, 54, the ECU 46 and/or from any other external source of data, e.g. 62. The program 28 compares signals to predetermined thresholds or thresholds that are combinations of individual thresholds stored in the data 30, in order to detect a hazard condition. The program includes one or more algorithms that process signals detected from the sensors and match them to parameters of predefined hazardous traffic scenarios. The algorithms calculate differences in expected times for the motorcycle and vehicle in the traffic scenario to reach a given point in the intersection, and determine a probability of an accident based on the value of this difference, taking into account a margin for error or a pre-defined tolerance or buffer time. If a hazardous condition is detected, the processor sends one or more signals to the haptic devices 34 in order to activate them, according to an activation pattern stored in the data 30. This indicates to the rider to slow down and use caution, and to be prepared to stop or swerve. If a non-hazardous condition is detected, a signal is optionally output to the haptic devices to indicate that the driver may proceed as intended.

Over the air safety updates to the program 28 in the system 20 provide increased ability to predict threats before they occur based on accident scenario modelling, and increased ability to detect more threat types. For example, existing simple blind spot detection (BSD) in an adjacent lane is enhanced with an update representing an ability to detect a driver encroaching into the rider's lane.

The rider's smartphone may connect to the control unit 22 in some embodiments to provide data 62, for example, to the system 20. This allows the rider to provide feedback for training of the AI model. The rider can also customize the operation of the system 20, e.g. by adjusting the size of the minimum threat area based on personal riding style, i.e. the area for which alerts are communicated to the rider. While alerts are only given for the threat area, an area greater than the threat area is monitored by the onboard sensors of the motorcycle. Riders can also adjust the pulse rate of the haptic vibration alerts to suit their personal preferences, and can turn certain threat notifications on and off. The rider's smartphone has an app with a tutorial on how to use and configure the safety system.

Figure 3:
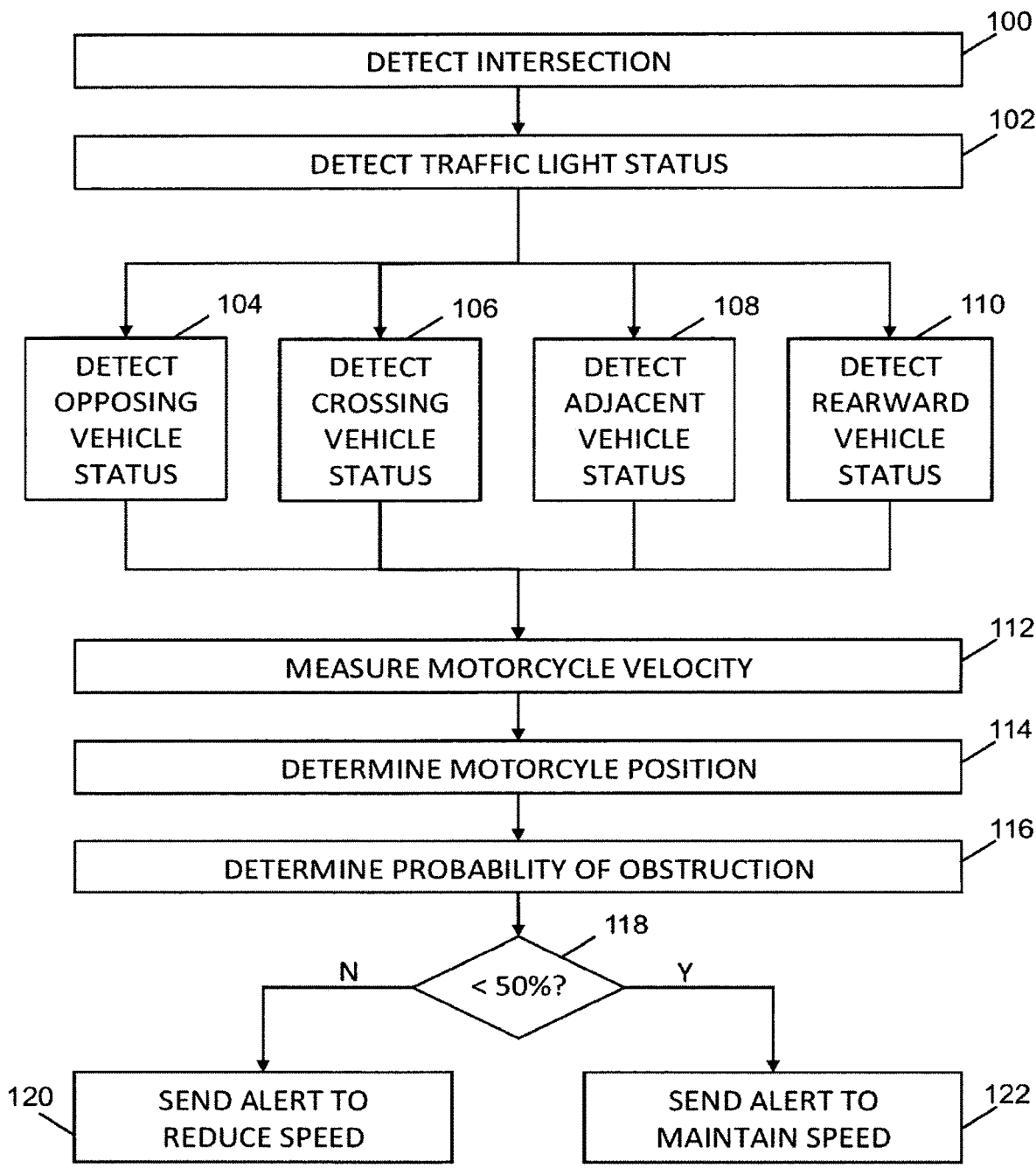
FIG. 3 is a flowchart showing a more specific embodiment of the application of the method.

Referring to FIG. 3, there is shown an embodiment of different steps that are taken in general by the safety system 20. In step 100, the safety system detects an intersection. In step 102, the safety system detects the traffic light status of the traffic lights at the intersection. In step 104, the safety system detects the status of an opposing vehicle, if present. An opposing vehicle is one that is heading towards the rider of the motorcycle in the opposite direction. In step 106, the safety system determines the status of a crossing vehicle, if present at or approaching the intersection. A crossing vehicle is in general travelling perpendicularly to the direction of travel of the rider. In step 108, the safety system determines the status of an adjacent vehicle if present, for example a vehicle is that in another lane to the side of the rider. In step 110, the safety system determines the status of vehicles rearward to the rider, if any. Steps 104-110 may occur in parallel or in sequence. In step 112, the safety system determines the velocity of the motorcycle. In step 114, the safety system determines the position of the motorcycle.

In step 116, the safety system then determines the probability of obstruction of the motorcycle's path by one of the vehicles in the intersection. In step 118, the safety system analyzes the probability and takes a decision regarding the value of the probability obtained in step 116. If the probability is inferior to 50%, the processor sends an alert to the one or more of the output devices on the motorcycle for the rider to maintain speed, in step 120. If the result is over 50%, the processor sends an alert to the output devices on the motorcycle, indicating that the driver should reduce speed, in step 122. In other embodiments, the threshold may be set as a different percentage, and it may be configurable by the rider.

Figure 4:
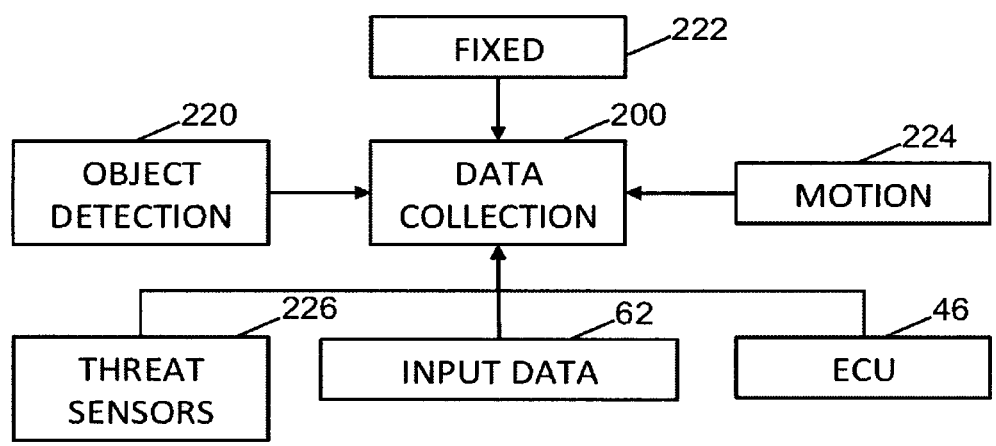
FIG. 4 is a flowchart describing the data collection in the method.

Referring to FIG. 4, there is shown a block diagram of the data collection process 200 for use with the safety system 20, and different groupings of the type of data detected or used. The data may include data associated with objects 220 that have been detected by the sensors such as cars, pedestrians or other motorcycles. The data may include fixed data 222 such as traffic lights, pedestrian walk light state, road surface marking, potholes, public benches, trashcans, etc. Motion-related data 224 is collected such as the speed, the direction and the behavior associated with moving objects (cars, trucks, motorcycles, etc.). As a result, over 100 data points may be collected in some embodiments of the safety system 20 from intersections using threat sensors 226 (i.e. a combination of one or more environmental sensors 42, handlebar sensors 50, seat sensors 52 and footpeg sensors 54), ECU 46 and input data 62.

D. Use-Cases

Figure 5:
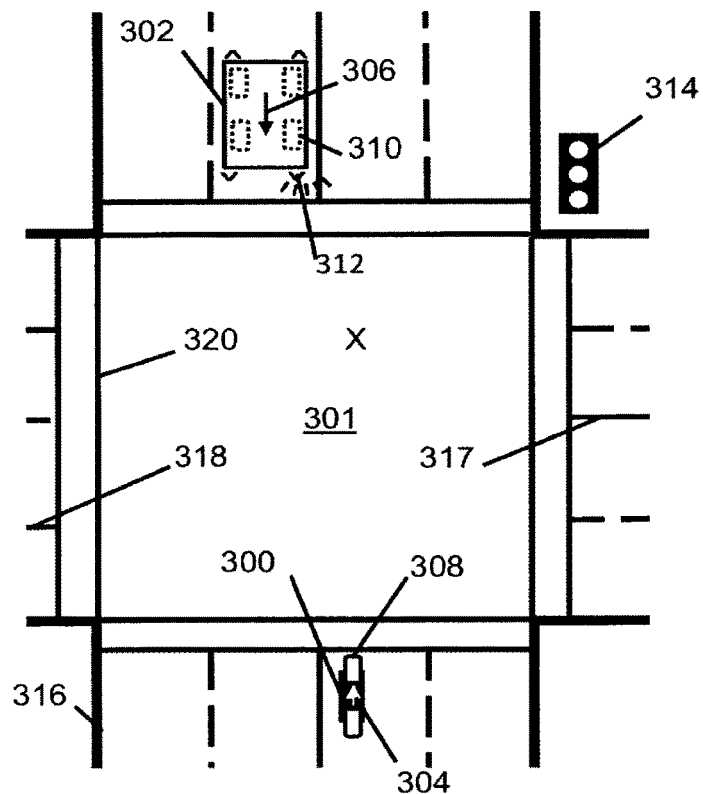
FIG. 5 is a schematic drawing of a first use case of an embodiment of the method.

Referring to FIG. 5, this is an embodiment of a first use case in which a motorcycle 300 equipped with the safety system 20 is about to cross an intersection 301, with an opposing vehicle 302 on its way to cross the same intersection. An arrow 304 on the motorcycle represents the direction of the motorcycle 300. An arrow 306 on the opposing vehicle 302 represents the direction of the opposing vehicle 302. A front wheel 308 of the motorcycle is shown. A front wheel 310 of the opposing vehicle is represented by dotted lines. A turn signal of the opposing vehicle 302 is represented at 312. A traffic light signal is represented at 314. A side of the road or street is represented at 316. Among different road surface markings, a solid central line is represented in 317, a broken line is represented at 318 and a pedestrian crossing is represented at 320.

This use-case leads to a reduction in frontal collisions with left turning opposing vehicles 302 by measuring the distance the opposing left turning vehicle has passed the cross walk 320 into the intersection 301, and estimating the probability of the left turn being committed to before the motorcycle 300 has entered the intersection.

Figure 6:
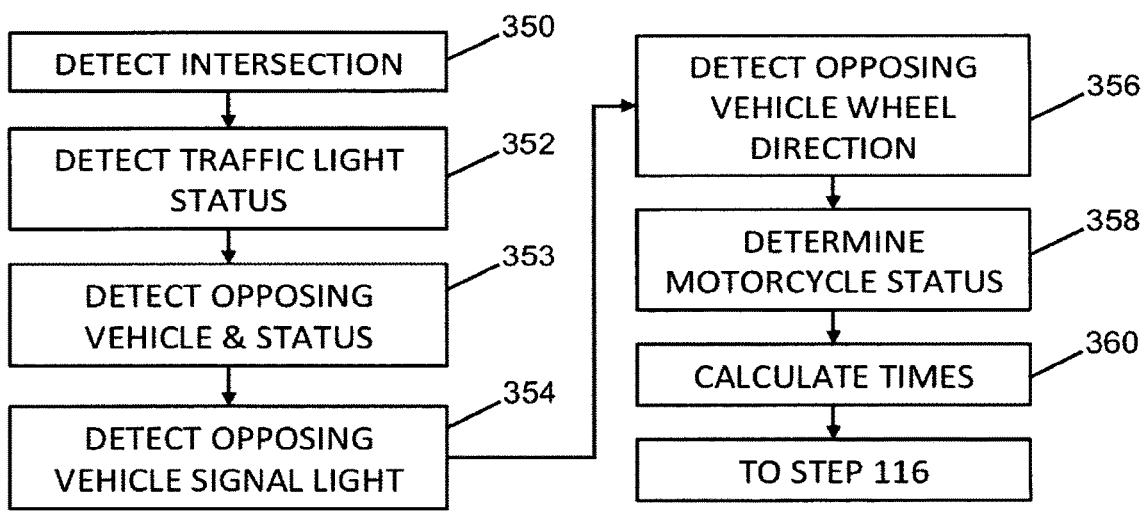
FIG. 6 is a flowchart describing the steps implemented during the first use case of an embodiment of the method.

Referring to FIG. 6, there is shown a flowchart describing the steps implemented during the application of the safety system 20 to the first use case. In step 350, the safety system detects the type of the intersection 301, via geo-location and a map utility. Wifi triangulation may also be used to determine the location of the rider. In step 352, the status of the traffic light 314 is detected by a camera vision system of the safety system 20. An increased weighting factor is applied if the traffic light 314 is amber prior to motorcycle entering intersection compared to a green light condition, the increased weighting factor causing the calculated probability of a collision to increase.

In step 353, the opposing vehicle 302 is detected and its position, within the intersection, and velocity are determined using camera vision, radar and/or lidar.

In step 354, the status of the turn signal light 312 of the opposing vehicle 302 is detected by the safety system. In step 356, the direction of the front wheels 310 of the opposing vehicle 302 are detected by the safety system.

In step 358, the status of the motorcycle 300 is determined by the safety system. This status may include characteristics such as the position, speed and the velocity of the motorcycle, and the intent of the rider. The motorcycle position within intersection is determined with a camera vision system connected to the safety system 20. Motorcycle velocity is measured by a wheel speed sensor and/or geo-location services on the motorcycle, the safety system 20, or in a mobile device such as a smart phone carried by the rider.

Next, the probability of threat associated with the use case is determined. In particular, the safety system 20 determines the likelihood that the opposing vehicle 302 will turn into the path of the motorcycle 300, by taking all data from steps 350-358 into account. Specifically, in step 360, the safety system 20 calculates the time it will take the opposing vehicle 302 to enter the path of the motorcycle (i.e. to reach point X, which may be referred to as an impact zone), and the time it will take the motorcycle to reach point X.

The process then passes to step 116 of FIG. 3 and compares the two times calculated above. If the time the opposing vehicle 302 would take to reach point X is about the same as the time it would take the motorcycle 304 to get to point X, then there is a high probability of collision. If the time the opposing vehicle 302 would take to reach point X is greater or less, by a comfortable safety margin, than the time it would take the motorcycle 304 to get to point X, then there is a low probability of collision.

By detecting the angle of the front wheels 310 of the opposing vehicle 302, as well as the vehicle's speed, the system accounts for vehicles that have turned their front wheels but are stationary, and vehicles that are creeping forward without turning, and determines that these vehicles pose a lower threat.

Figure 7:
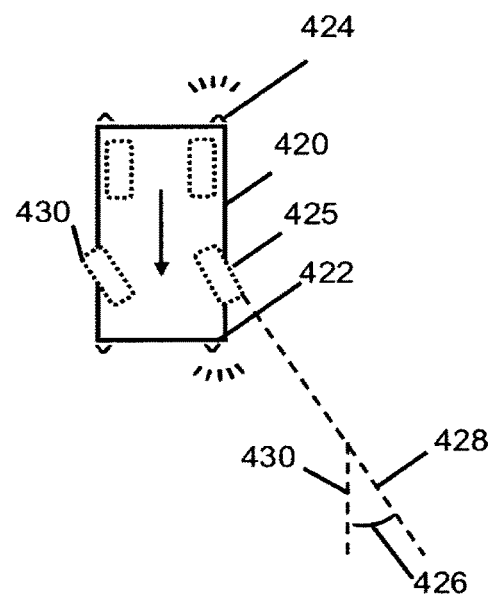
FIG. 7 is a schematic drawing of a car with its front wheels turned left.

Referring to FIG. 7, an embodiment is shown of the calculation method used for determining the status of the front wheel direction of a turning vehicle 420. The vehicle has its front 422 and rear 424 left turn signal lights flashing in order to indicate its turning direction. An image of the vehicle 420 is captured by an on-board camera on the motorcycle, and, using object detection techniques known in image analysis, the front wheel 425 is identified, the body of the vehicle is identified, the orientation of the front wheel 425 is determined, the orientation of the vehicle is identified, and the angle of the wheel 425 relative to the angle of the vehicle is calculated. The turning direction of the front wheel 425 is measured using the angle 426 formed between a line 428 parallel to the side of one of the front wheels 425 of the vehicle 420 and a second line 430 parallel to the side of the vehicle. Depending on the position of the camera on the motorcycle and the construction of the vehicle 420, both front wheels 425, 430 may be visible to the camera, and a calculation of the turning angle will be made for both front wheels.

Figure 8:
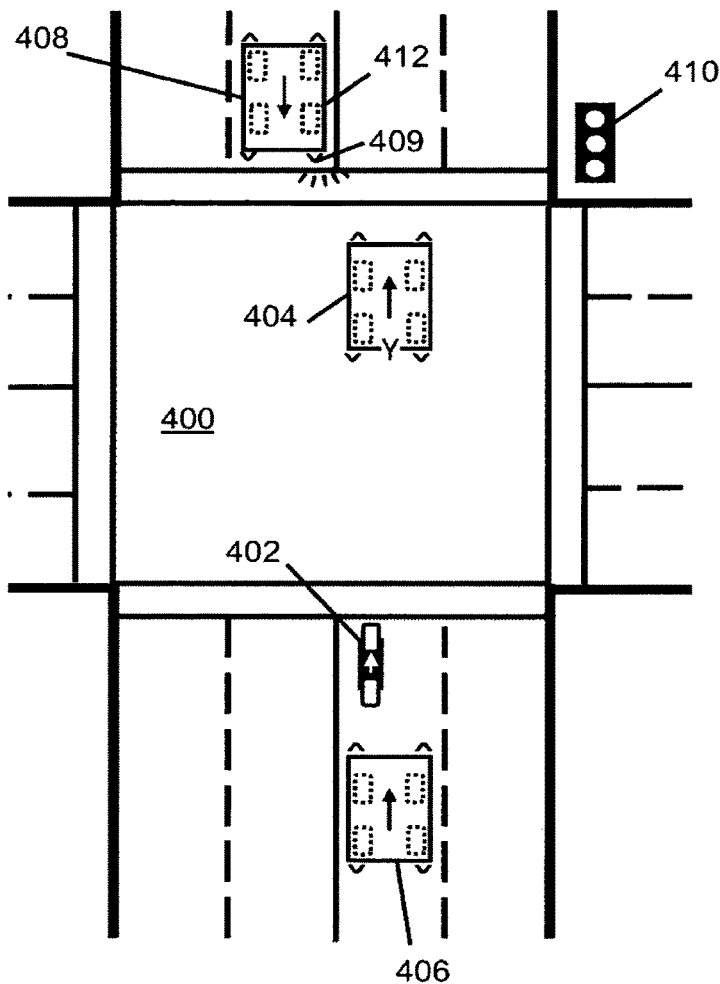
FIG. 8 is a schematic drawing of a second use case of an embodiment of the method.

Referring to FIG. 8, an embodiment of a second use case is described. The second use-case leads to a reduction in frontal collisions or being struck broadside in an intersection, where an opposing left turning car sees a gap between a car moving in the opposite direction and the motorcycle following this car.

This intersection 400 has a motorcycle 402; a leading vehicle 404 positioned ahead and in the same lane as the motorcycle, moving in the same direction as the motorcycle, and crossing the intersection in a straight direction. A second vehicle 406 is located in the same lane as the motorcycle 402 and is located rearward of the motorcycle. A third, opposing vehicle 408, with turn signal 409 and front wheels 412, is arriving at the intersection 400 in an opposite direction to the motorcycle 402. The intersection 400 has a traffic light 410.

Figure 9:
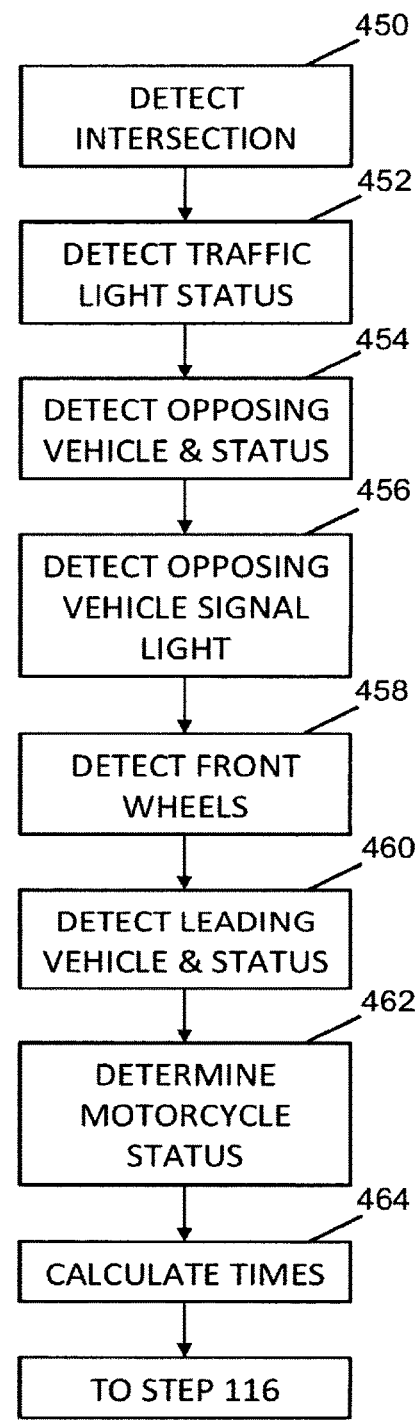
FIG. 9 is a flowchart describing the steps implemented during the second use case of an embodiment of the method.

Referring to FIG. 9, there is shown a flowchart describing the steps implemented during the application of the safety system 20 to the second use case. In step 450, the safety system detects the type of the intersection 400, via geo-location and a map utility. In step 452, the status of the traffic light 410 is detected by a camera vision system of the safety system 20. An increased weighting factor is applied if the traffic light 410 is amber prior to motorcycle 402 entering intersection compared to the traffic light being green, the increased weighting factor causing the calculated probability of a collision to increase.

In step 454, the opposing vehicle 408 is detected and its position, within the intersection 400, and velocity are determined using camera vision, radar and/or lidar.

In step 456, the status of the turn signal light 409 of the opposing vehicle 408 is detected by the safety system 20.

In step 458, the direction of the front wheels 412 of the opposing vehicle 408 is detected by the safety system 20. The detection of the front wheel direction is calculated taking into account the presence of the leading vehicle 404. It is recognized that the leading vehicle 404 will at least partially block the view of the opposing vehicle 408, however, the cameras on the motorcycles will capture what they can, the program will determine what it can from the captured images, which will show a partial view of the opposing vehicle, and make the best determination of a hazard that it can. The cameras, when mounted low on the motorcycle, will be able to view the opposing vehicle 406 underneath the leading vehicle 404, at least partially. A camera on the rider's helmet may have a view of the vehicle 404 over the vehicle 406. If the scenario cannot be properly analyzed, the rider will be alerted to take caution while crossing the intersection.

In step 460, the leading vehicle 404 is detected and its position, within the intersection 400, and velocity are determined using camera vision, radar and/or lidar.

In step 462, the status of the motorcycle 402 is determined by the safety system 20. This status may include characteristics such as the position, speed and the velocity of the motorcycle, and the intent of the rider. The motorcycle position within intersection is determined with a camera vision system connected to the safety system 20. In particular, the distance between the motorcycle 402 and the leading vehicle 404 is determined. Motorcycle velocity is measured by a wheel speed sensor and/or geo-location services on the motorcycle, the safety system 20, or in a mobile device such as a smart phone carried by the rider.

Next, the probability of threat associated with the use case is determined. In particular, the safety system 20 determines the likelihood that the opposing vehicle 408 will turn into the path of the motorcycle 402, by taking all data from steps 450-462 into account. Specifically, in step 464, the safety system 20 calculates the time it will take the opposing vehicle 408 to enter the path of the motorcycle (i.e. to reach point Y), and the time it will take the motorcycle to reach point Y.

The process then passes to step 116 of FIG. 3 and compares the two times calculated above. If the time the opposing vehicle would take to reach point Y is about the same as the time it would take the motorcycle to get to point Y, then there is a high probability of collision. If the time the opposing vehicle would take to reach point Y is greater or less, by a comfortable safety margin, than the time it would take the motorcycle to get to point Y, then there is a low probability of collision.

The calculation may also be done, for example, by measuring the gap between the motorcycle and vehicle directly in front of it to determine if there is enough room for the opposing vehicle to pass through, based on the motorcycle's current velocity. It may also take into account the velocity of the following vehicle 406 and the gap between the following vehicle 406 and the leading vehicle 404.

Figure 10:
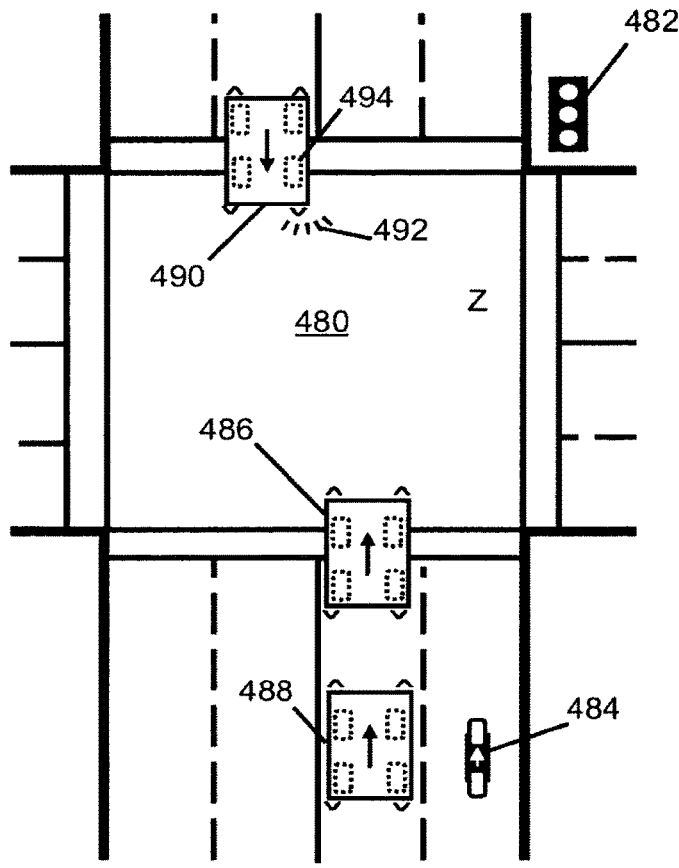
FIG. 10 is a schematic drawing of a third use case of an embodiment of the method.

FIG. 10 shows a third use-case at intersection 480 with traffic light 482. The third use-case represents a reduction in frontal collisions or being struck broadside in an intersection when the motorcycle 484 is obstructed from view of an opposing left turning vehicle 490 by traffic that is adjacent to the motorcycle forming a barrier. The system 20 detects the formation of this barrier and the upcoming intersection, and alerts the rider to use caution when approaching the intersection.

The motorcycle 484 is heading straight across the intersection 480 in the right lane. To the left of the motorcycle 480 there is a leading adjacent vehicle 486 and a second adjacent vehicle 488, either heading in the same direction as the motorcycle or waiting to turn left. An opposing vehicle 490 is entering the intersection from the opposite direction to the motorcycle 484.

Figure 11:
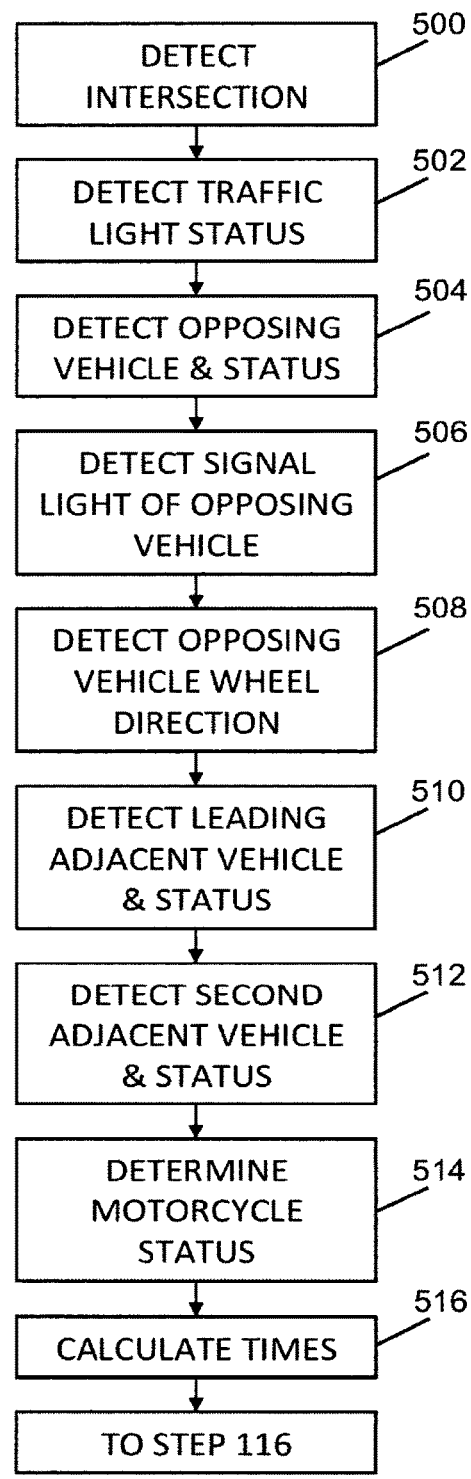
FIG. 11 is a flowchart describing the steps implemented during the third use case of an embodiment of the method.

Referring to FIG. 11, there is shown a flowchart describing the steps implemented during the application of the safety system 20 to the third use case. In step 500, the safety system detects the type of the intersection 480, via geo-location and a map utility. In step 502, the status of the traffic light 482 is detected by a camera vision system of the safety system 20. An increased weighting factor is applied if the traffic light 482 is amber prior to motorcycle 484 entering intersection compared to the traffic light being green, the increased weighting factor causing the calculated probability of a collision to increase.

In step 504, the opposing vehicle 490 is detected and its position, within the intersection 480, and velocity are determined using camera vision, radar and/or lidar.

In step 506, the status of the turn signal light 492 of the opposing vehicle 492 is detected by the safety system 20.

In step 508, the direction of the front wheels 494 of the opposing vehicle 490 is detected by the safety system 20. The detection of the front wheel direction is calculated taking into account the presence of the leading adjacent vehicle 486 and the adjacent vehicle 488. It is recognized that the leading and second adjacent vehicles 486, 488 will at least partially block the view of the opposing vehicle 490, however, the cameras on the motorcycles will capture what they can, the program will determine what it can from the captured images, which will show a partial view of the opposing vehicle, and make the best determination of a hazard that it can. The cameras, when mounted low on the motorcycle, will be able to view the opposing vehicle underneath the adjacent vehicles, at least partially. A camera on the rider's helmet may have a view of the vehicle 490 over the vehicles 486 or 488. If the scenario cannot be properly analyzed, the rider will be alerted to take caution while crossing the intersection.

In step 510, the leading adjacent vehicle 486 is detected and its position, within the intersection 480, and velocity are determined using camera vision, radar and/or lidar.

In step 512, the second adjacent vehicle 488 is detected and its position, within the intersection 480, and velocity are determined using camera vision, radar and/or lidar.

In step 514, the status of the motorcycle 484 is determined by the safety system 20. This status may include characteristics such as the position, speed and the velocity of the motorcycle, and the intent of the rider. The motorcycle position within intersection is determined with a camera vision system connected to the safety system 20. Motorcycle velocity is measured by a wheel speed sensor and/or geo-location services on the motorcycle, the safety system 20, or in a mobile device such as a smart phone carried by the rider.

Next, the probability of threat associated with the use case is determined. In particular, the safety system 20 determines the likelihood that the opposing vehicle 490 will turn into the path of the motorcycle 484, by taking all data from steps 500-514 into account. Specifically, in step 516, the safety system 20 calculates the time it will take the opposing vehicle 490 to enter the path of the motorcycle (i.e. to reach point Z), and the time it will take the motorcycle to reach point Z.

The process then passes to step 116 of FIG. 3 and compares the two times calculated above. If the time the opposing vehicle would take to reach point Z is about the same as the time it would take the motorcycle to get to point Z, then there is a high probability of collision. If the time the opposing vehicle would take to reach point Z is greater or less, by a comfortable safety margin, than the time it would take the motorcycle to get to point Z, then there is a low probability of collision.

Figure 12:
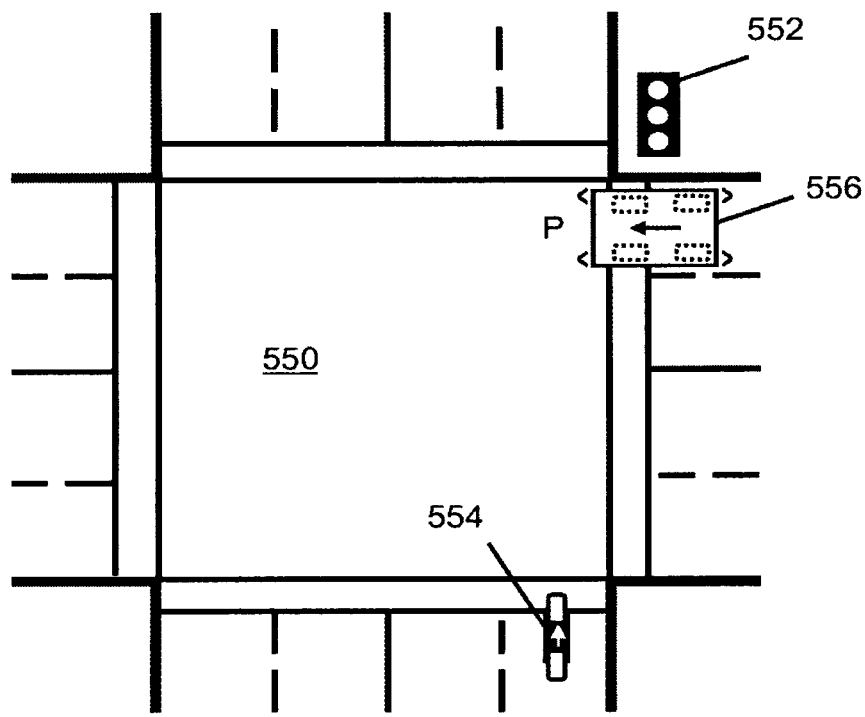
FIG. 12 is a schematic drawing of a fourth use case of an embodiment of the method.

FIG. 12 shows a fourth use-case at intersection 550 with traffic light 552. The fourth use-case leads to a reduction in frontal and broadside collision with crossing vehicles by detecting a cross-traffic vehicle and its state. The system determines the likelihood that the vehicle will cross the intersection and obstruct the path of the motorcycle based on these conditions.

The motorcycle 554 is heading straight across the intersection 550 in the right lane. A crossing vehicle 556 is entering the intersection from the right of the motorcycle 554. This situation applies when the crossing vehicle 556 is hitting the intersection at speed at the moment the traffic lights for the cross traffic turn green. It also applies when the crossing vehicle 556 anticipates a green light and enters the intersection early. It also applies when the crossing vehicle 556 enters the intersection as the traffic lights for the cross direction turn red, or have turned red.

Figure 13:
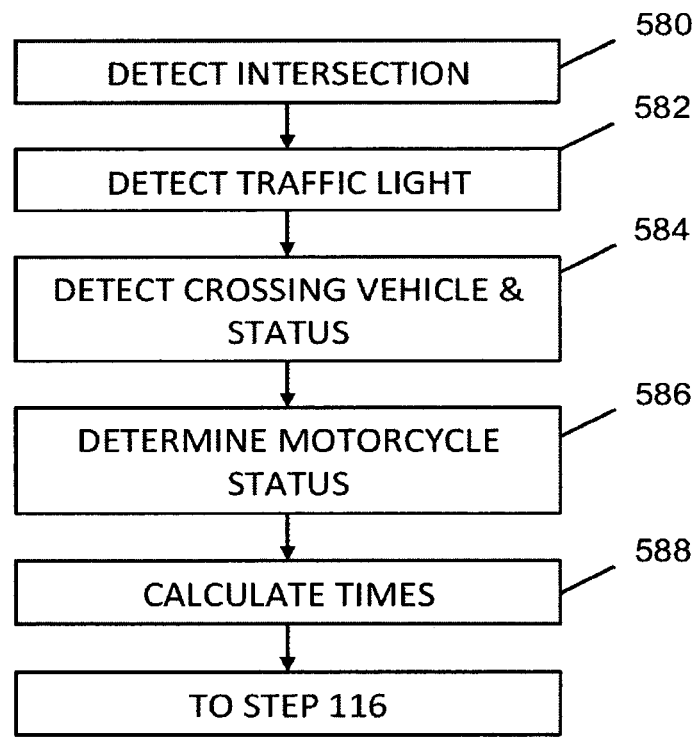
FIG. 13 is a flowchart describing the steps implemented during the fourth use case of an embodiment of the method.

Referring to FIG. 13, there is shown a flowchart describing the steps implemented during the application of the safety system 20 to the fourth use case. In step 580, the safety system detects the type of the intersection 550, via geo-location and a map utility. In step 582, the status of the traffic light 552 is detected by a camera vision system of the safety system 20. An increased weighting factor is applied if the traffic light 552 is amber prior to motorcycle 554 entering intersection compared to the traffic light being green, or if the traffic light has just turned green compared to having been green for a couple of seconds or so, the increased weighting factor causing the calculated probability of a collision to increase.

In step 584, the crossing vehicle 556 is detected and its position, within the intersection 550, and velocity are determined using camera vision, radar and/or lidar.

In step 586, the status of the motorcycle 554 is determined by the safety system 20. This status may include characteristics such as the position, speed and the velocity of the motorcycle, and the intent of the rider. The motorcycle position within intersection is determined with a camera vision system connected to the safety system 20. Motorcycle velocity is measured by a wheel speed sensor and/or geo-location services on the motorcycle, the safety system 20, or in a mobile device such as a smart phone carried by the rider.

Next, the probability of threat associated with the use case is determined. In particular, the safety system 20 determines the likelihood that the crossing vehicle 556 will enter the path of the motorcycle 554, by taking all data from steps 580-586 into account. Specifically, in step 588, the safety system 20 calculates the time it will take the crossing vehicle 556 to enter the path of the motorcycle (i.e. to reach point P), and the time it will take the motorcycle to reach point P.

The process then passes to step 116 of FIG. 3 and compares the two times calculated above. If the time the opposing vehicle would take to reach point P is about the same as the time it would take the motorcycle to get to point P, then there is a high probability of collision. If the time the opposing vehicle would take to reach point P is greater or less, by a comfortable safety margin, than the time it would take the motorcycle to get to point P, then there is a low probability of collision.

A similar analysis applies for when the vehicle 556 is turning right.

Figure 14:
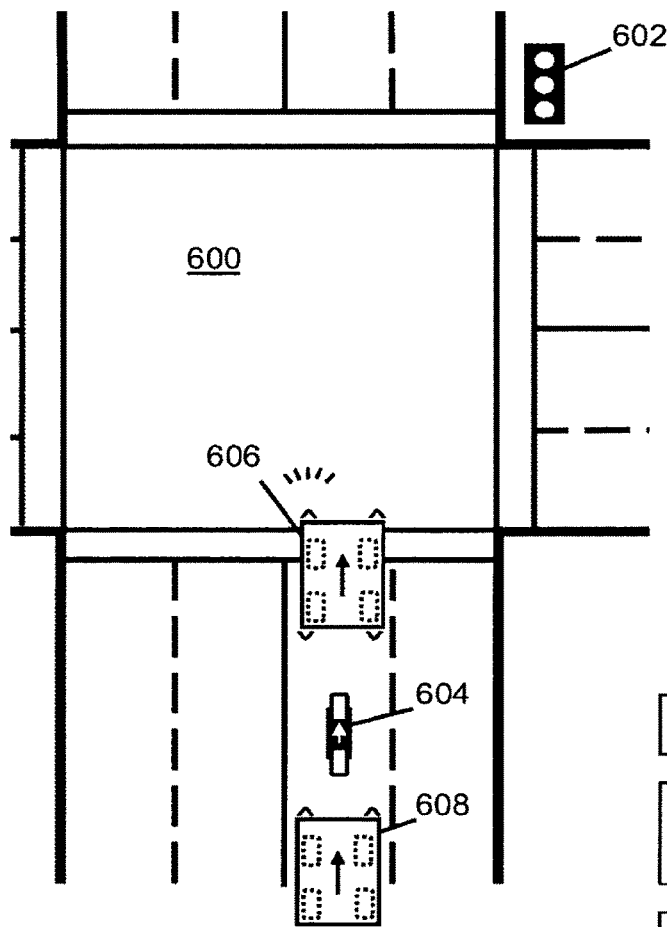
FIG. 14 is a schematic drawing of a fifth use case of an embodiment of the method.

FIG. 14 shows a fifth use-case at intersection 600 with traffic light 602. The motorcycle 604 is heading straight across the intersection 600. Ahead of the motorcycle 604 there is a leading vehicle 606 and behind the motorcycle there is a following vehicle 608, the leading vehicle intending to turn left.

The fifth use-case represents a reduction in rear collision from a vehicle 608 approaching a motorcycle 604 from behind. The system 20 detects an approaching vehicle 608 from the rear of the motorcycle 604 and measures its velocity, path and size to determine the likelihood of a collision. An alert mechanism signals to the motorcycle rider the direction and severity of the impending threat.

Figure 15:
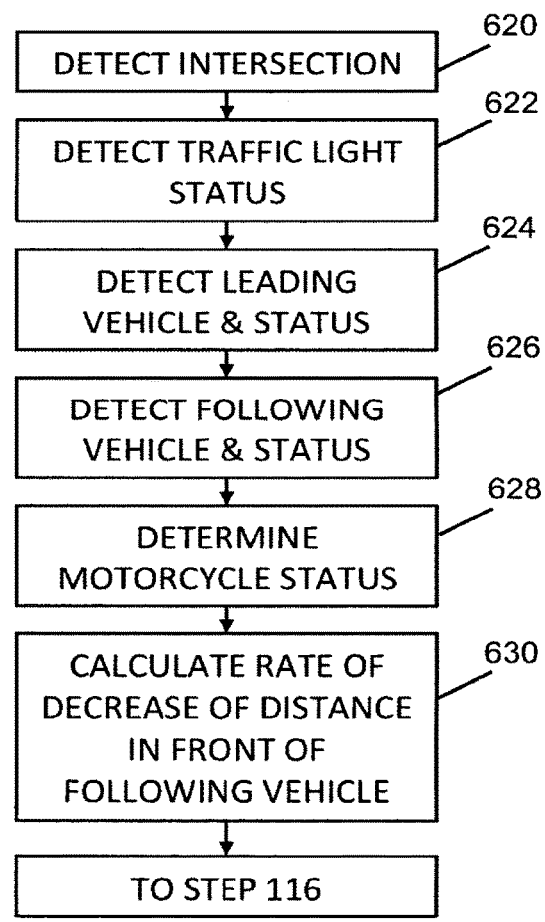
FIG. 15 is a flowchart describing the steps implemented during the fifth use case of an embodiment of the method.

Referring to FIG. 15, there is shown a flowchart describing the steps implemented during the application of the safety system 20 to the fifth use case. In step 620, the safety system detects the type of the intersection 600, via geolocation and a map utility. In step 622, the status of the traffic light 602 is detected by a camera vision system of the safety system 20. An increased weighting factor is applied if the traffic light 602 is amber prior to motorcycle 604 entering intersection compared to the traffic light being green, the increased weighting factor causing the calculated probability of a collision to increase.

In step 624, the leading vehicle 606 is detected and its position and velocity are determined using camera vision, radar and/or lidar.

In step 626, the following vehicle 608 is detected and its position and velocity are determined using camera vision, radar and/or lidar.

In step 628, the status of the motorcycle 604 is determined by the safety system 20. This status may include characteristics such as the position, speed and the velocity of the motorcycle, and the intent of the rider. The motorcycle position relative to the intersection is determined with a camera vision system connected to the safety system 20. In particular, the distance between the motorcycle 604 and the leading vehicle 606 is determined, and the distance between the motorcycle and the following vehicle 608 is determined. Motorcycle velocity is measured by a wheel speed sensor and/or geo-location services on the motorcycle, the safety system 20, or in a mobile device such as a smart phone carried by the rider.

Next, the probability of threat associated with the use case is determined. In particular, the safety system 20 determines the likelihood that the following vehicle 608 will collide with the motorcycle 604, by taking all data from steps 620-628 into account. Specifically, in step 630, the safety system 20 calculates the rate in decrease of distance between the following vehicle 608 and the motorcycle 604 (i.e. the following vehicle's available stopping distance).

The process then passes to step 116 of FIG. 3 and analyzes the rate of decrease calculated above. If the rate of decrease is sufficient for the following vehicle 608 to stop before hitting the motorcycle 604, then there is a low probability of collision. This is the likely situation if the leading vehicle is continuing straight across the intersection 600. However, if the rate of decrease is not sufficient for the following vehicle 608 to stop before hitting the motorcycle 604, then there is a high probability of collision. This is a possible situation if the leading vehicle slows down to turn left through the intersection 600. This scenario is similar to the traffic on a highway suddenly coming to a standstill due to an accident. The calculation of whether a collision will occur involves calculating the trajectories of the motorcycle 604 and the following vehicle 608, and calculating whether the two trajectories interfere. If they interfere, a collision is highly likely.

Figure 16:
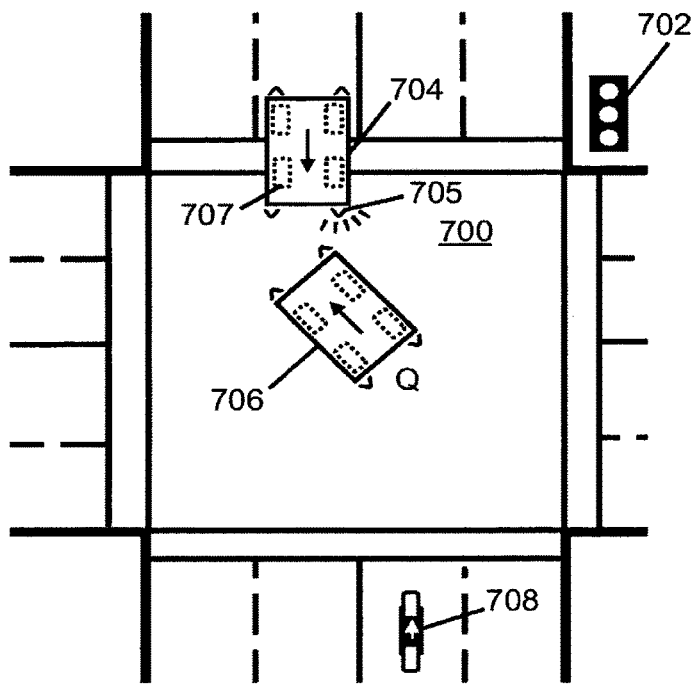
FIG. 16 is a schematic drawing of a sixth use case of an embodiment of the method.

Referring to FIG. 16, an embodiment of a sixth use case is shown at intersection 700 with traffic light 702. The sixth use-case leads to a reduction in frontal collisions where an opposing left turning car 704, with turn signal 705, has its view of the motorcycle 708 potentially obscured by a car 706 turning left in front of the motorcycle.

Figure 17:
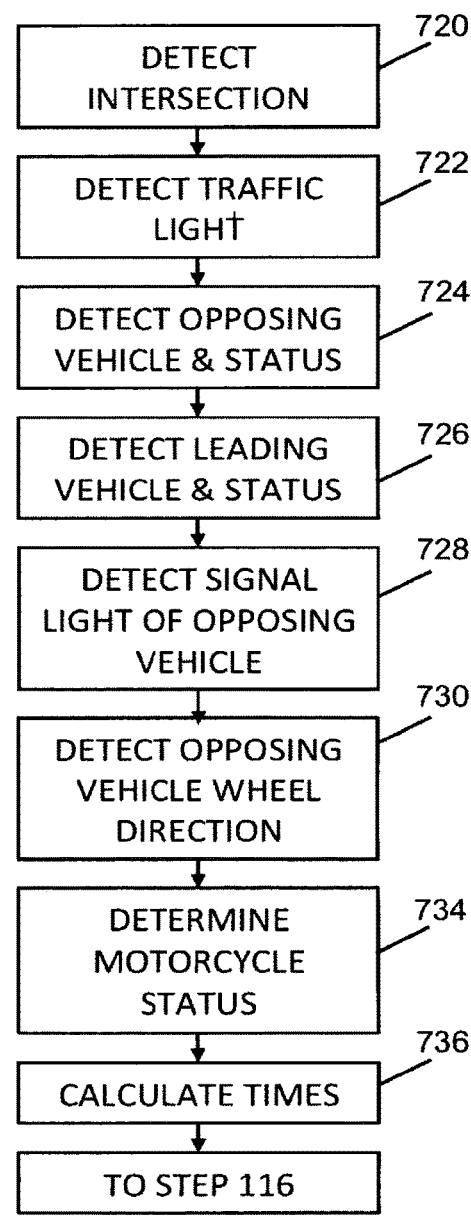
FIG. 17 is a flowchart describing the steps implemented during the sixth use case of an embodiment of the method.

Referring to FIG. 17, there is shown a flowchart describing the steps implemented during the application of the safety system 20 to the sixth use case. In step 720, the safety system detects the type of the intersection 700, via geolocation and a map utility. In step 722, the status of the traffic light 702 is detected by a camera vision system of the safety system 20. An increased weighting factor is applied if the traffic light 702 is amber prior to motorcycle 708 entering intersection compared to the traffic light being green, the increased weighting factor causing the calculated probability of a collision to increase.

In step 724, the opposing vehicle 704 is detected and its position, within the intersection 700, and velocity are determined using camera vision, radar and/or lidar.

In step 726, the leading vehicle 706 is detected and its position, within the intersection 700, and velocity are determined using camera vision, radar and/or lidar.

In step 728, the status of the turn signal light 705 of the opposing vehicle 704 is detected by the safety system 20.

In step 730, the direction of the front wheels 707 of the opposing vehicle 704 is detected by the safety system 20. The detection of the front wheel direction is calculated taking into account the presence of the leading vehicle 706. It is recognized that the leading vehicle 706 will at least partially block the view of the opposing vehicle 704, however, the cameras on the motorcycles will capture what they can, the program will determine what it can from the captured images, which will show a partial view of the opposing vehicle, and make the best determination of a hazard that it can. The cameras, when mounted low on the motorcycle, will be able to view the opposing vehicle underneath the leading vehicle, at least partially. A camera on the rider's helmet may have a view of the vehicle 704 over the vehicle 706. If the scenario cannot be properly analyzed, the rider will be alerted to take caution while crossing the intersection.

In step 734, the status of the motorcycle 708 is determined by the safety system 20. This status may include characteristics such as the position, speed and the velocity of the motorcycle, and the intent of the rider. The motorcycle position within intersection is determined with a camera vision system connected to the safety system 20. In particular, the distance between the motorcycle 708 and the leading vehicle 706 is determined, and the distance between the motorcycle and the opposing vehicle 704. Motorcycle velocity is measured by a wheel speed sensor and/or geo-location services on the motorcycle, the safety system 20, or in a mobile device such as a smart phone carried by the rider.

Next, the probability of threat associated with the use case is determined. In particular, the safety system 20 determines the likelihood that the opposing vehicle 704 will turn into the path of the motorcycle 708, by taking all data from steps 720-734 into account. Specifically, in step 736, the safety system 20 calculates the time it will take the opposing vehicle 704 to enter the path of the motorcycle (i.e. to reach point Q), and the time it will take the motorcycle to each point Q.

The process then passes to step 116 of FIG. 3 and compares the two times calculated above. If the time the opposing vehicle would take to reach point Q is about the same as the time it would take the motorcycle to get to point Q, then there is a high probability of collision. If the time the opposing vehicle would take to reach point Q is greater or less, by a comfortable safety margin, than the time it would take the motorcycle to get to point Q, then there is a low probability of collision.

Figure 18:
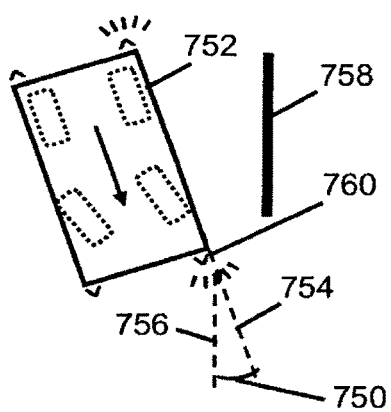
FIG. 18 is a schematic diagram of a car angled to the left relative to a road direction.

Referring to FIG. 18, an alternate or complementary calculation method is shown, for determining the angle 750 formed by an opposing vehicle 752 when turning. The angle is measured between a line 754 drawn from the side of the vehicle and second line 756 parallel or drawn from the side of the road 758. The left light signals 760 of the vehicle 752 are represented flashing in order to indicate the intended direction of the vehicle. Camera vision and image analysis is used to determine the orientation of the vehicle 752 relative to the line 758 of the intersection. This calculation is used in some embodiments as well as the calculation to determine the angle of the front wheels of an opposing vehicle.

Figure 19:
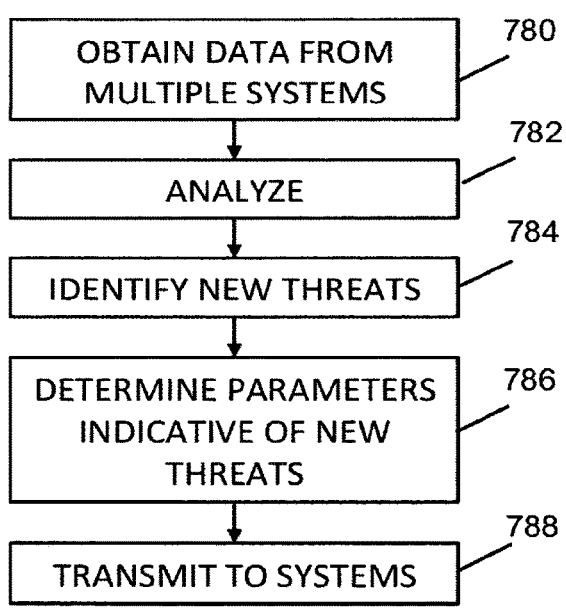
FIG. 19 is a flowchart of a process for communicating data relating to new threats between multiple systems, according to an embodiment of the present invention.

FIG. 19 shows a flowchart of a process in which data is crowd sourced with multiple systems 20. In step 780, data is obtained, by a server, from the sensors of multiple systems 20 on different motorcycles. In step 782, the server analyzes the data and in step 784, identifies threats that have been previously unknown to the systems 20. This is achieved by looking for traffic patterns that result in a near collision with a motorcycle, or even traffic patterns that result in a collision. In step 786, the server determines which parameters are indicative of the new threats, such as the position, speed and direction of other vehicles relative to the motorcycle and the intersection. These parameters can be considered to be a signature for a potential accident scenario, and are transmitted to the safety systems 20 as and when feasible, in step 788.

E. Variations

While the best presently contemplated mode of carrying out the subject matter disclosed and claimed herein has been described, other embodiments are possible.

For example, the calculation of the trajectories of the motorcycle and the other vehicles in the intersection are based on the accelerations of the motorcycles and vehicles as well as their instantaneous velocities. In this case the calculations of the time for the motorcycle and other vehicles to reach a given point is based on assuming that the acceleration is maintained.

The rate at which the opposing vehicle's front wheel angle is changing, rather than its instantaneous angle, is also taken into account in some embodiments.

Directions that are determined for the vehicles and motorcycle may be straight or curved.

While specific examples of accident scenarios have been given, the principles disclosed herein can be applied in other use-cases. In particular, as many threat use-cases as reasonably possible should be included in the system 20.

The invention may in some embodiments be applied to three-wheelers, automobiles, trucks and public transport vehicles.

In some embodiments, the architecture of the program 28 incorporates data computation redundancy for calculating the threats. This helps to alleviate the problems that may be caused by one of the cameras on the motorcycle being obscured by a vehicle, for example. An opposing vehicle without a left-turn signal activated will still be monitored for the angle of its front wheels, its speed and its direction, as each method of computation detects a different cue that the opposing vehicle is about to turn, and not all methods may be available.

In some embodiments, the output of the system 20 is programmed to operate the brakes of the motorcycle automatically, e.g. when emergency braking is called for. Operation of the brakes automatically is dependent on the system continuing to detect a grip of the rider on the handlebars.

In the event of an accident, an automatic call to the emergency services, next-of-kin or another person is made in some embodiments.

In some embodiments, the onboard computer modularity 'stacks' for space and cost-efficiency, based on number of systems installed on a rider's motorcycle. For example, one motorcycle is equipped with a BSD module and another is equipped with BSD and Forward Collision Warning (FCW) modules.

In other embodiments, the rider is able to tag a ride that has been monitored and recorded by the system, after the ride has been completed. The tag may be, for example, a particular behaviour style. Tags may also be made to dangerous scenarios that the rider encountered, which were not notified to the rider.

The system 20 may in some embodiments capture poor driver behaviour with the onboard cameras and automatically notify other riders in the vicinity using similar systems that there is a poor driver nearby. Likewise, system 20 detects notifications from nearby riders of other motorcycles that there is a poor driver in the vicinity, and informs the rider of such via the haptic devices, for example, or via an audio signal. The colour, type, and/or registration number of the vehicle may be detected and transmitted in the notification. Determination of the presence of other riders with similar systems 20 in the vicinity can be made using Bluetooth™ beaconing, for example.

Haptic signals may be augmented with visual signals provided by LEDs (light emitting diodes). Audible alerts may also be given to the rider as well as the haptic alerts. Visible and audible signals may be simultaneous with the haptic signals.

Examples have been given that apply in countries that drive on the right, and can be reflected to apply equally to countries that drive on the left.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense.

It will be clear to one having skill in the art that further variations to the specific details disclosed herein can be made, resulting in other embodiments that are within the scope of the invention disclosed. Other steps may be added to the flowcharts, or one or more may be removed without altering the main function of the anticipatory safety system described herein. Modules may be divided into constituent modules or combined into larger modules. All configurations described herein are examples only and actual ones depend on the specific embodiment. Accordingly, the scope of the invention is to be construed in accordance with the substance defined by the following claims.

The invention claimed is:

1. A method for informing a motorcycle rider about a traffic scenario comprising the steps of:

detecting an environment of the motorcycle, comprising detecting:
an intersection;
a traffic light status at the intersection;
a vehicle at the intersection;
a direction of the vehicle;
a speed of the vehicle; and
an angle of a front wheel of the vehicle;
detecting a behaviour of the motorcycle by determining:
a speed of the motorcycle and
a direction of travel of the motorcycle;
analyzing the environment, using data regarding the intersection, the traffic light status, the direction of the vehicle, the speed of the vehicle and the angle of the front wheel of the vehicle, to determine the traffic scenario, wherein the vehicle forms part of the traffic scenario;
determining, using the determined traffic scenario and the detected behaviour of the motorcycle, a probability of an accident involving the motorcycle in the traffic scenario; and
outputting, on the motorcycle, an alert to the motorcycle rider, wherein the alert is indicative of the probability of an accident.

2. The method of claim 1 comprising determining whether the probability is above or below a threshold, wherein the alert is of a first type when the probability is above the threshold and of a second type when the probability is below the threshold.

3. The method of claim 1, wherein analyzing the environment comprises determining a condition of a road surface.

4. The method of claim 1, comprising:
detecting that the traffic light status is amber; and
weighting the probability.

5. The method of claim 1, comprising:
calculating, using the speed and direction of the motorcycle, a time that the motorcycle is expected to take to reach a point in the intersection;
calculating, using the speed and direction of the vehicle, a time that the vehicle is expected to reach the point; and
calculating a difference between said times;
wherein the step of determining the probability uses said difference.

6. The method of claim 5, wherein the probability is higher when said difference is less than a predetermined value than when said difference is greater than the predetermined value.

7. The method of claim 1, the motorcycle by:
wherein detecting the environment comprises:
detecting a second vehicle behind the motorcycle, the second vehicle forming at least a part of the traffic scenario;
detecting a direction of the second vehicle; and
detecting a speed of the second vehicle;
wherein the analyzing step uses data regarding the second vehicle direction and second vehicle speed.

8. The method of claim 7, comprising:
calculating, using the speed and direction of the motorcycle, a trajectory of the motorcycle;
calculating, using the speed and direction of the second vehicle, a trajectory of the second vehicle; and
calculating whether said trajectories interfere;
wherein the step of determining the probability uses said interference calculation.

9. The method of claim 1, comprising:
detecting a change in body weight distribution of the motorcycle rider;
determining an intent of the motorcycle rider, the intent being correlated to the change in body weight distribution; and
using the intent of the motorcycle rider in the determination of the probability of an accident.

10. The method of claim 1, wherein determining the probability of an accident comprises determining whether:
the vehicle, being an opposing vehicle, will turn into a path of the motorcycle; or
the vehicle, being an opposing vehicle, will turn into the path of the motorcycle after a second vehicle has advanced through the intersection ahead of the motorcycle; or
the vehicle, being an opposing vehicle, will turn between a third vehicle and a fourth vehicle into the path of the motorcycle, the third and fourth vehicles advancing through the intersection alongside the motorcycle; or
the vehicle, entering the intersection in a direction perpendicular to that of the motorcycle, will collide with the motorcycle; or
a fifth vehicle behind the motorcycle will collide into the motorcycle, the motorcycle being behind the vehicle as the vehicle waits to turn; or
the vehicle, being an opposing vehicle, will turn into the path of the motorcycle, the vehicle having a view of the motorcycle at least partially obscured by a sixth vehicle turning ahead of the motorcycle.

11. The method of claim 1, wherein the speed of the vehicle is zero.

12. A system for informing a motorcycle rider about a traffic scenario comprising:
a processor;
multiple sensors mounted on the motorcycle and connected to the processor;
multiple haptic alert devices mounted on the motorcycle and connected to the processor; and
computer readable memory storing computer readable instructions, which, when executed by the processor cause the processor to:
detect an environment of the motorcycle by reading data from said sensors to detect an intersection and a vehicle at the intersection;
analyze the environment to determine the traffic scenario, wherein the vehicle forms part of the traffic scenario;
determine, using the determined traffic scenario and a detected behaviour of the motorcycle, a probability of an accident involving the motorcycle in the traffic scenario;
output an alert via at least one of the haptic alert devices, the alert being indicative of the probability of an accident;
record a ride made by the motorcycle; and
record a tag, received from the motorcycle rider, for a dangerous traffic scenario that the motorcycle rider encountered during the ride and was not informed of.

13. The system of claim 12 further comprising a right visual alert device and a left visual alert device, wherein:
the sensors comprise a forward facing camera, a rearward facing camera, a camera mounted in a helmet worn by the rider, a forward pointing radar, a rearward pointing radar, a forward pointing lidar, a rearward pointing lidar, an infrared detector, a microphone, a humidity sensor, a rain sensor, a temperature sensor or any combination selected therefrom; and the haptic alert devices are located in a seat and on a left handlebar, a right handlebar, a left footpeg and a right footpeg.

14. The system of claim 12 further comprising a server connected to the processor, the server configured to:
obtain data from multiple systems for informing other motorcycle riders about traffic scenarios;
analyze the data from the multiple systems to determine traffic patterns that result in a collision or a near collision with another motorcycle; and
communicate updates to the processor, wherein the updates include said determined traffic patterns.

15. The system of claim 12 wherein the sensors comprise a directional microphone.

16. A system for informing a motorcycle rider about a traffic scenario comprising:
a processor;
multiple sensors mounted on the motorcycle and connected to the processor, wherein the sensors comprise a sensor mounted low enough on the motorcycle to look under other vehicles;
multiple haptic alert devices mounted on the motorcycle and connected to the processor; and
computer readable memory storing computer readable instructions, which, when executed by the processor cause the processor to:
detect an environment of the motorcycle by reading data from said sensors to detect an intersection and a vehicle at the intersection;
analyze the environment to determine the traffic scenario, wherein the vehicle forms part of the traffic scenario;
determine, using the determined traffic scenario and a detected behaviour of the motorcycle, a probability of an accident involving the motorcycle in the traffic scenario; and
output an alert via at least one of the haptic alert devices, the alert being indicative of the probability of an accident.

17. The system of claim 16 further comprising a server connected to the processor, the server configured to:
obtain data from multiple systems for informing other motorcycle riders about traffic scenarios;
analyze the data from the multiple systems to determine traffic patterns that result in a collision or a near collision with another motorcycle; and
communicate updates to the processor, wherein the updates include said determined traffic patterns.

18. The system of claim 16 wherein the sensors comprise a directional microphone.

19. A system for informing a motorcycle rider about a traffic scenario comprising:
a processor;
multiple sensors mounted on the motorcycle and connected to the processor;
multiple haptic alert devices mounted on the motorcycle and connected to the processor; and
computer readable memory storing computer readable instructions, which, when executed by the processor cause the processor to:
detect an environment of the motorcycle by reading data from said sensors to detect an intersection and a vehicle at the intersection;
analyze the environment to determine the traffic scenario, wherein the vehicle forms part of the traffic scenario;
determine, using the determined traffic scenario and a detected behaviour of the motorcycle, a probability of an accident involving the motorcycle in the traffic scenario;
output an alert via at least one of the haptic alert devices, the alert being indicative of the probability of an accident;
detect a grip of the motorcycle rider on handle bars of the motorcycle; and
operate, subject to continued detection of the grip, brakes on the motorcycle when emergency braking is called for.

20. The system of claim 19 wherein the sensors comprise a directional microphone.

* * * * *

UNITED STATES PATENT AND TRADEMARK OFFICE
CERTIFICATE OF CORRECTION

Page 1 of 1

PATENT NO. : 11,189,166 B2
APPLICATION NO. : 16/761176
DATED : November 30, 2021
INVENTOR(S) : Giraud et al.

It is certified that error appears in the above-identified patent and that said Letters Patent is hereby corrected as shown below:

In the Claims

Claim 7, Line 1, delete: "the motorcycle by:"

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*